US008806442B2

(12) United States Patent
Birenheide et al.

(10) Patent No.: US 8,806,442 B2
(45) Date of Patent: Aug. 12, 2014

(54) REMOTE DEBUGGING PROXY

(75) Inventors: Richard Birenheide, Neckargemünd (DE); Eckart Langhuth, Wiesloch (DE); Matthias Thorsten Metzler, Forst (DE)

(73) Assignee: SAP AG, Walldorf (DE)

( * ) Notice: Subject to any disclaimer, the term of this patent is extended or adjusted under 35 U.S.C. 154(b) by 1514 days.

(21) Appl. No.: 11/281,528

(22) Filed: Nov. 16, 2005

(65) Prior Publication Data
US 2007/0055958 A1     Mar. 8, 2007

Related U.S. Application Data

(63) Continuation of application No. 11/221,667, filed on Sep. 7, 2005.

(51) Int. Cl.
*G06F 9/44* (2006.01)
(52) U.S. Cl.
USPC .......................................... 717/127
(58) Field of Classification Search
USPC .......................................... 717/127
See application file for complete search history.

(56) References Cited

U.S. PATENT DOCUMENTS

| 6,026,362 | A  | * | 2/2000  | Kim et al. ............... 705/317 |
| 6,637,024 | B1 | * | 10/2003 | Johnson et al. ......... 717/124 |
| 6,910,073 | B2 |   | 6/2005  | Banga et al. |
| 7,412,625 | B2 | * | 8/2008  | Shankar et al. .......... 714/38 |
| 7,437,716 | B1 | * | 10/2008 | Cantrill ................... 717/128 |
| 7,530,053 | B2 |   | 5/2009  | Pugh et al. |
| 2002/0087950 | A1 | * | 7/2002 | Brodeur et al. ........... 717/124 |
| 2002/0129337 | A1 | * | 9/2002 | Evans et al. .............. 717/124 |
| 2006/0195894 | A1 | * | 8/2006 | Nita et al. ................. 726/11 |
| 2007/0055957 | A1 |   | 3/2007 | Birenheide et al. |
| 2007/0055958 | A1 |   | 3/2007 | Birenheide et al. |

OTHER PUBLICATIONS

The PDBG Process-level Debugger for Parallel and Distributed Programs Joao Lourenco, Jose Cunha Proceedings of the SIGMETRICS symposium on Parallel and distributed tools 1998.*
Monitoring PVM Programs Using the DAMS Approach Jose Cunha, Vitor Duarte Lecture Notes in Computer Science; vol. 1497 pp. 273-280 Year of Publication: 1998.*
A framework to support parallel and distributed debugging Jose Cunha et al. Lecture Notes in Computer Science vol. 1401 Year of Publication: 1998 pp. 708-717.*
A graphical development and debugging environment for parallel programs Peter Kacsuk et al. Parallel Computing vol. 22 , Issue 13 (Feb. 1997) pp. 1747-1770.*
Design and Implementation of a Distributed Monitor for Semi-On-Line Monitoring of VisualMP Applications Norbert Podhorszki and Peter Kacsuk Distributed and parallel systems: from instruction parallelism to cluster computing pp. 23-32 Springer, 2000.*

(Continued)

*Primary Examiner* — Emerson Puente
*Assistant Examiner* — Paul Mills
(74) *Attorney, Agent, or Firm* — Schwegman, Lundberg & Woessner, P.A.

(57) ABSTRACT

An apparatus and method for a remote debugging proxy. An embodiment of a method for debugging a system includes receiving notification of an event regarding a target system at a first proxy component, requesting information from the target computing system regarding the event, and receiving the information from the target computing system. The event notification is transferred to a debugging component via a second proxy component, and the requested information is transferred to the second proxy component.

16 Claims, 6 Drawing Sheets

(56) References Cited

OTHER PUBLICATIONS

A Portable Debugger for Parallel and Distributed Programs Doreen Cheng and Robert Hood Proceedings on Supercomputing Publication Date: Nov. 14-18, 1994 on pp. 723-732.*
Debugging Protocol for Remote Cross Development Environment Seungwoo Son, Chaedeok Lim, Heung-Nam Kim Published: 2000.*
A Portable Debugger for Parallel and Distributed Programs Doreen Cheng and Robert Hood Published: 1994.*
Dictionary definition(s) for "proxy" Published: 2013.*
Implementing a Remote Debugging Agent Using the GNU Debugger William Gatliff Published: 2001.*
Embedding with GNU: the gdb Remote Serial Protocol William Gatliff Published: 1999.*
Java Debug Wire Protocol Specification Details—54 pages.
Java Debug Wire Protocol—6 pages.
Setting and Clearing Breakpoints Via JDWP—A Technical Note for JOS Developers—2 pages.
Java Platform Debugger Architecture Overview—4 pages.
Java Platform Debugger Architecture—Architecture Overview—5 pages.
*DDBG: A Distributed Debugger—User's Guide* University of Westminster, Final Report of the HPCTI Project,(1996),13 pgs.
U.S. Appl. No. 11/221,667, Non-Final Office Action mailed May 12, 2009, 18 pgs.
U.S. Appl. No. 11/221,667, Non-Final Office Action mailed Nov. 27, 2009, 17 pgs.
U.S. Appl. No. 11/221,667, Preliminary Amendment filed Nov. 15, 2005, 1 pg.
U.S. Appl. No. 11/221,667, Response filed Aug. 12, 2009 to Non Final Office Action mailed May 12, 2009, 10 pgs.
U.S. Appl. No. 11/221,667, Response filed Mar. 29, 2010 to Non Final Office Action mailed Nov. 27, 2009, 10 pgs.
U.S. Appl. No. 11/221,667, Final Office Action mailed May 14, 2010, 21 pgs.
U.S. Appl. No. 11/221,667, Response filed Aug. 2, 2010 to Final Office Action mailed May 14, 2010, 10 pgs.
U.S. Appl. No. 11/221,667, Non Final Offie Action mailed Nov. 24, 2010, 14 pgs.
U.S. Appl. No. 11/221,667, Response filed Feb. 18, 2011 to Non Final Office Action mailed Nov. 24, 2010, 11 pgs.
Cheng, Doreen, et al., "A Portable Debugger for Parallel and Distributed Programs", Nov. 14-18, 1994, Proceedings on Supercomputing. Computer Sciences Corporation, NASA Ames Research Center, Moffett Field, CA 94035-1000, (Nov. 1994), 732-732.
U.S. Appl. No. 11/221,667, Advisory Action mailed Jul. 8, 2011, 6 pgs.
U.S. Appl. No. 11/221,667, Final Office Action mailed Apr. 29, 2011, 17 pgs.
U.S. Appl. No. 11/221,667, Response filed Jun. 20, 2011 to Final Office Action mailed Apr. 29, 2011, 11 pgs.
U.S. Appl. No. 11/221,667, Appeal Brief filed Oct. 28, 2011, 16 pgs.
U.S. Appl. No. 11/221,667, Examiner's Answer to Appeal Brief mailed Dec. 8, 2011, 26 pgs.

* cited by examiner

REMOTE DEBUGGING PROXY

The present application is a continuation of U.S. patent application Ser. No. 11/221,667 filed Sep. 7, 2005.

TECHNICAL FIELD

Embodiments of the invention generally relate to the field of client/server systems and, more particularly, to an apparatus and method for a remote debugging proxy.

BACKGROUND

In the development of computer applications, it is necessary to efficiently and effectively detect errors in order to make corrections and complete development. This debugging process is an extremely important part of software product maintenance, and often requires a large portion of the overall time and effort that is expended on the application.

In certain environments it may be possible to debug a system remotely. For example, a Java application may be debugged remotely in the Java platform debugger architecture (JPDA). In this way, an application that is running on a remote client virtual machine may be debugged via a connection with a debugging system.

However, a connection between a remote client and a debugging system may slow the developing process. This border or boundary between the local and remote systems may have a low bandwidth and the response time over such connection may be high. In such circumstances, the remote debugging process may become very time intensive. In, for example, the JPDA, every transaction between the client and server in a conventional protocol requires a roundtrip request and response cycle. The result may be a slow debugging process that hampers application maintenance.

SUMMARY OF THE INVENTION

A system and method for a remote debugging proxy are described.

According to a first embodiment of the invention, a method for debugging a computer application includes receiving notification of an event regarding a target computing system at a first proxy component and requesting information from the target computing system about the event. The method further includes receiving the requested information from the target computing system, transferring the event notification to a debugging component via a second proxy component, and transferring the requested information to the second proxy component.

Under a second embodiment of the invention, a proxy component includes a first connector that is coupled with a system to be debugged, and a second connector that is coupled with a proxy for a debugging component. The proxy component further includes an information collector to collect data regarding events of the system to be debugged.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to a system and method for a remote debug proxy.

In one embodiment of the invention, a software development system, such as an integrated development environment (IDE), remotely debugs an application through use of a proxy system. In one embodiment, a debugging system includes a proxy for processing information requests. In a particular embodiment, a debugger proxy includes a local proxy engine for the debugger and a remote proxy engine for the target system that is being evaluated. A remote debugging proxy obtains information regarding a target system and transfers the information to a local debugging proxy. A local debugging proxy receives information regarding a target system, caches the information, and retrieves the information from the cache when a request for information is received.

In application development, a remote debugging process includes a debugging system that performs remote debugging operations on a target system. In an embodiment of the invention, a remote debugging process includes a proxy system for the transfer of information. In one embodiment, communications between the debugging system and the target system are rerouted through a proxy component on the debugging side (which may be referred to as a local side proxy) and a proxy component on the target side (which may be referred to as a remote side proxy). In this embodiment, the remote side proxy collects context depended information regarding the target system, compresses the information, and sends the information to the local side proxy. The local side proxy caches the information, and can then quickly respond to many requests for information by accessing the cache, thereby eliminating many communications that would otherwise be transferred across the boundary between the local and remote sides.

In a particular example, a Java remote debug proxy system may be provided for a Java process that debugged via a remote connection. A debugging operation may be implemented using the Java platform debugger architecture (JPDA). (Java Platform Debugger Architecture, JPDA 1.0) In such architecture, a virtual machine (which is generally a portion of a larger system that appears to have a separate processor) is debugged by a debugging component, or debugger (a system that is intended to identify or fix errors, or bugs, in applications). A debugger may be included in an IDE or other development system. The elements of a debugging system may include a front-end software protocol or module, a back-end software protocol or module, a communication channel, and a user interface (UI). The virtual machine and the back-end software protocol are known as the debuggee (or the remote side), while the front end software protocol and the user interface may be referred to as the debugger (or the local side). The back-end is responsible for communicating requests from the debugger front-end to the debuggee/virtual machine and for communicating the response to the requests to the frond end. The communications are transferred across a communications channel that links the front-end with the back-end of the debugger system, and with the details of the communication channel varying with the implementation.

The JPDA provides interfaces and protocols for communication that define the debugging services a virtual machine provides, define the high-level interface for remote debugger applications, and define the communication between the debuggee and the debugger processes across the communication channel (which may be referred herein as a border or boundary between the local and remote sides). The JPDA consists of three layers, the layers being:

(a) Java Virtual Machine Debug Interface (JVMDI)—The interface defining the debugging services that a virtual machine provides.

(b) Java Debug Wire Protocol (JDWP)—The protocol to define the communications between the debugger and the target virtual machine (or debuggee) processes. The communication over the communication channel is specified by the JDWP.

(c) Java Debug Interface (JDI)—The high-level Java language interface for use in writing remote debugger applications. The user interface is a client of the JDI.

In conventional remote debugging processes, debugging can be slow, particularly if the connection across the communication channel has a high response time. In such an operation, the performance of the system may suffer because of the need to make numerous transmissions across the slow connection. In one example, a Java application is debugged remotely via a JDWP communication channel between the Java application and a debugger. The JDWP allows a debugger to work either in a different process on the same computer or on a remote computer. However, the JDWP is a low level request and response system. In such a system, any user interface that requires detailed information about the target system state is thus required to collect this information via multiple round trip communications across the boundary between the local-debugging side and the remote-target side.

In a remote debugging process, the types of communication that are authorized by the protocol describing the communication channel may be very limited. Because of this, numerous communications may be required to accomplish debugging objectives. For example, in JDWP operations there are two basic types of packets, which are command packets and reply packets. In this system, any debugging operation relies on the use of multiple commands and replies. The command packets may be sent by either the debugger or the target virtual machine. The debugger uses command packets to request information from the target virtual machine or to control program execution. The target virtual machine uses command packets to notify the debugger of an event in the target virtual machine, which may include a breakpoint or an exception.

In the JDWP process, a reply packet is only sent in response to a command packet. A reply packet will indicate the success or failure of the command and may carry data that was requested in the command. An event sent from the target virtual machine to the debugger generally does not require any reply. The JDWP is an asynchronous protocol, and multiple command packets may be sent before a reply is received. The format of each packet is set by the JDWP, with each packet containing a header of a set length with specified information, followed by data, if any.

In a remote debugging operation using JDWP, a debugging process will require multiple requests from the debugger to obtain data regarding the target system. Each request is in the form of a certain JDWP command packet. The target system is required then to reply to each command using a JDWP reply packet. Thus, there may be a large number of requests and responses, each requiring a time-consuming round trip communication across the interface boundary between the debug side and the remote side.

In an embodiment of the invention, a remote debugging proxy system may reduce the number of round trip communications required for processing and the total amount of data transferred between the local and remote sides, thereby increasing the efficiency of the debugging operation. In the embodiment, the communications are rerouted through proxies, with a proxy engine on the local side and a proxy engine on the remote side. The remote side proxy collects context depended information about the target system, and then compresses the information and sends it to the local proxy. The local proxy stores the information and retrieves the information as needed, thereby avoiding certain round trip requests across the boundary between the remote and local sides.

In one example, a target virtual machine may send a message such as a suspend event indicating that processing is suspended. Upon receiving such event, the remote proxy collects additional information regarding the current event. The remote proxy then compresses the collected information to minimize the time required for transmission, and sends the information to the local proxy via a JDWP-extension command. The local proxy receives the command, and identifies the command as a JDWP-extension command. The local proxy decompresses the information and stores the information in a cache and sends the original suspend command on to the debugger. The debugger receives the suspend command and starts a user interface update. Based on the user interface update, the debugger may send one or more commands to request more information, with the local proxy receiving the request commands from the debugger. In response, the local proxy will retrieve a reply from the cache if the needed information has been stored in the cache. If the reply to a request is not available from the cache, the local proxy forwards the request to the remote proxy for processing. The remote proxy receives the request and provides the request to the target virtual machine to obtain the needed information, which may then be returned to the debugger via the remote proxy and the local proxy.

Figure 1:
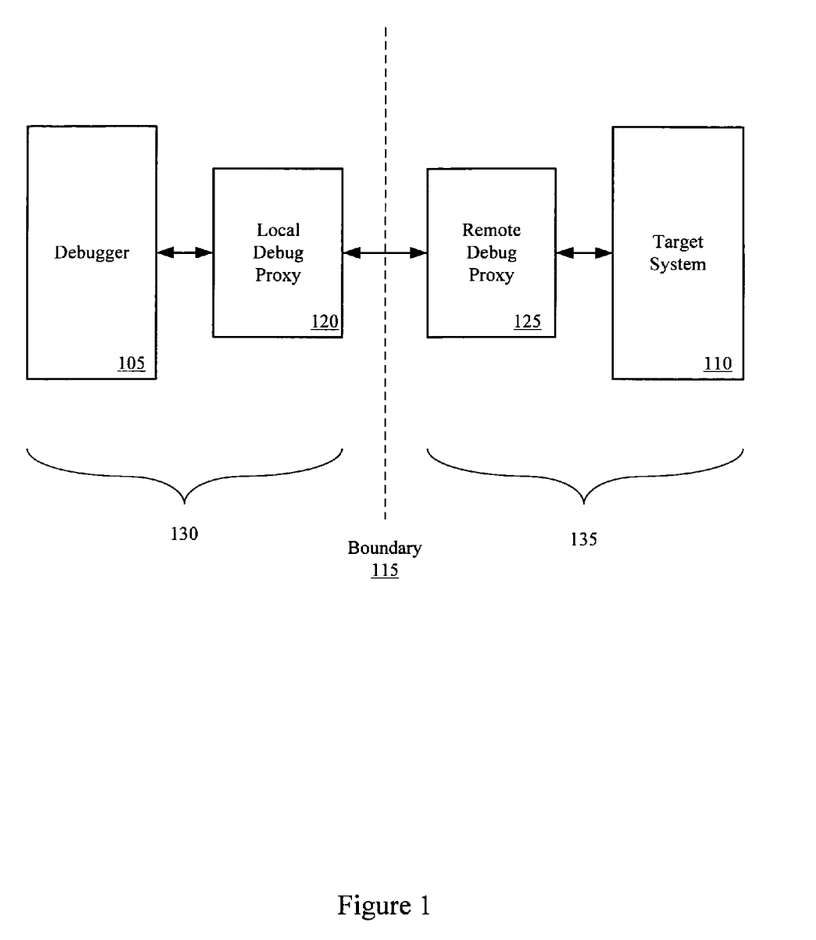
FIG. 1 is an illustration of an embodiment of a remote proxy debugging system.

FIG. 1 is an illustration of an embodiment of a remote proxy debugging system. In this illustration, a debugging component illustrated as debugger 105, which may include a virtual machine or other system, is remotely debugging an application on a target system 110, or debuggee. In a Java platform architecture environment, the debugger includes a front end software protocol or module, which implements the high level JDI, and a user interface or UI. The debuggee includes the virtual machine that is the target of the debugging operation, and a back-end software protocol or module. The debuggee implements the JVMDI for communication with the virtual machine However, the remote debugging process requires communications across a border 115, such as over a communication channel in the JPDA. The border 115 may be a slow (high ping, low bandwidth) boundary that thus slows debugging performance.

In an embodiment of the invention, the remote debugging process is implemented through use of proxy engine operations. In an embodiment, the debugger 105 (which is on the "local" side of the border 115) is coupled with a local debug proxy 120 and the target system (on the "remote" side of the border 115)) is coupled with a remote debug proxy 125. The debugger 105 and local debug proxy 120 may make up a fast LAN (local area network) or a single virtual machine 130. The remote debug proxy 125 and the target system 110 may make up a fast LAN. The local debug proxy 120 and the remote debug proxy 125 communicate across the boundary 115.

In an embodiment of the invention, the local debug proxy 120 obtains information regarding the target system from the remote debug proxy 125 and caches such information for future requests. For example, the target system 110 may issue a suspend event, which may trigger a request from the remote debug proxy 125 to collect more information. The information is received by the remote debug proxy, compressed if necessary, and transferred to the local debug proxy 120. The local debug proxy 120 stores the information in a cache or other memory for future use, and sends on the suspend event to the debugger 105. When the debugger 105 requires information for the debugging process, the request is directed through the local debug proxy engine 120. If the local debug proxy 120 has information to respond to the request stored in the memory, the desired information is retrieved from the memory of the local debug proxy 120. If the local debug proxy has not cached the information that is needed to respond to the request from the debugger 105, then the local debug proxy 120 will forward the request to the remote debug proxy 125, which will then operate with the target system 110 to collect the information needed for the reply.

Figure 2:
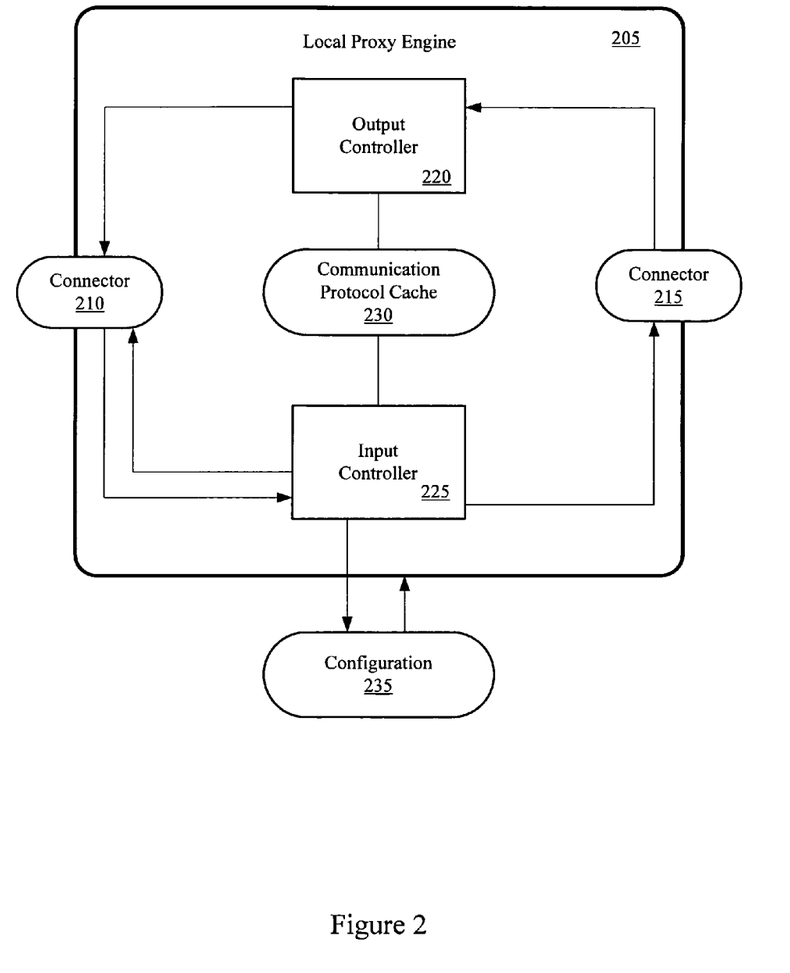
FIG. 2 is an illustration of an embodiment of a local proxy engine.

FIG. 2 is an illustration of an embodiment of a local proxy engine. The local proxy engine 205 is used in remote debugging of applications. The local proxy engine 205 may, for example, represent the local debug proxy 120 shown in FIG. 1. In this illustration, the local proxy engine 205 includes a first connector 210, which may be coupled with a debugger (such as debugger 105 in FIG. 1, not shown in FIG. 2), and a second connector 215 which may be used to communicate with a remote proxy (such as remote proxy engine 125 in FIG. 1, not shown in FIG. 2) that is coupled with a target system or virtual machine. The connectors may be JDI connectors. The local proxy engine further includes an output controller 220, an input controller 225, and a communication protocol cache 230. The local proxy engine 205 may also relate to a proxy configuration 235 to direct the configuration of the engine.

The input controller 225 listens for commands received by the first connector 210 from the debugger. If a message is received by the local proxy engine 205 at the first connector 210, the message is transferred to the input controller 225. If the message is a proxy configuration command, then the input controller 225 will handle the configuration 235. If the message is a JDWP command from the debugger, then the input controller 225 will attempt to obtain the reply from the communication protocol cache 230. If the required information is found in the cache 230, then a reply is sent to the debugger via first connector 210. If the information is not found in the cache 230, then the command is sent to the debuggee (such as via the remote proxy engine 305 in FIG. 3) via second connector 215.

The output controller 220 listens for commands received by the second connector 215 from the target or remote proxy. The output controller 220 will analyze any received message and take necessary actions, including unpacking data, storing the data in the communication protocol cache 230 if appropriate, and related actions. The output controller 220 will send an event or reply (depending on the command content) to the debugger via the first connector 210. If the local proxy engine 205 receives information in connection with an event that has occurred, then the information is directed to the output controller 220, which may then save the information in the communication protocol cache 230 for use in addressing future inquiries.

In an example, the debugger may send a command requesting information in connection with an event, the command being received at the first connector 210. The command is directed to the input controller 225, which interprets the command as a JDWP command. The output controller 220 accesses the communication protocol cache 230 and determines whether the information is present in the cache 230. If the information is present, then a reply containing the information is transferred to the debugger via the first connector 210. If the needed information is not present in the cache 230, then the request command is directed from the output controller 220 to the remote proxy engine via the second connector 215. A reply command may then be received at the second connector 215 and be directed to the output controller 220. The output controller can then interpret the received reply, and then provide the reply to the first connector 210 for transmission to the debugger.

Figure 3:
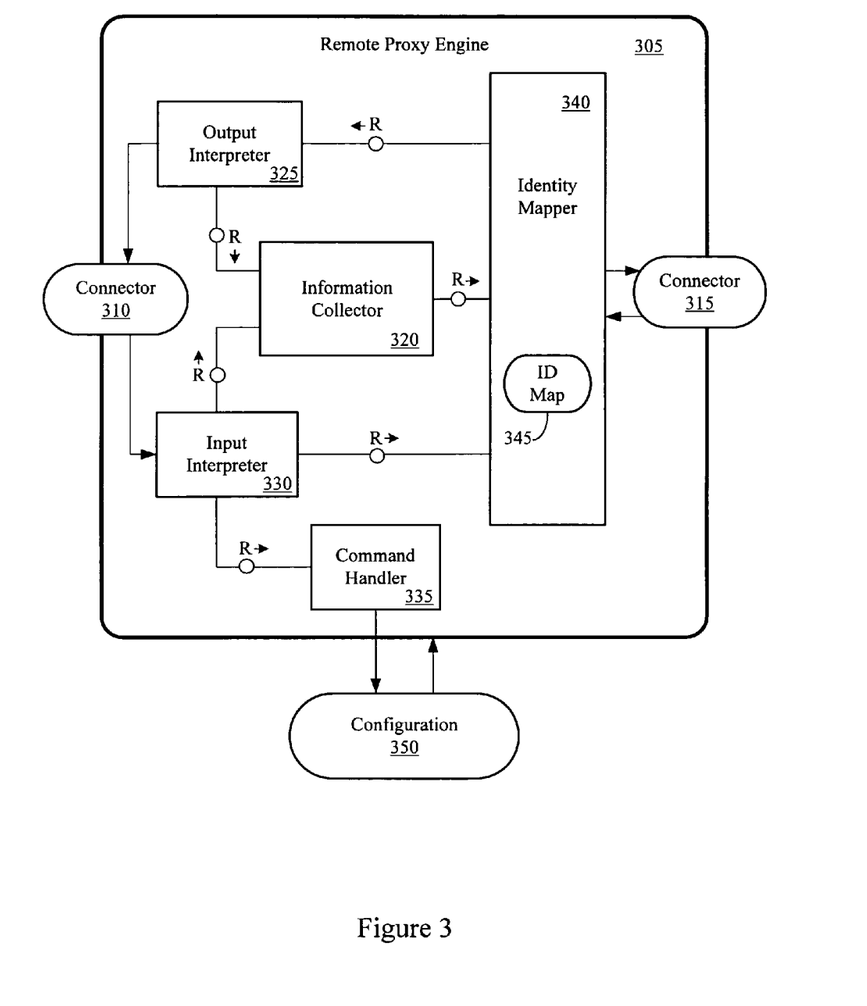
FIG. 3 is an illustration of an embodiment of a remote proxy engine.

FIG. 3 is an illustration of an embodiment of a remote proxy engine. In this illustration, a remote proxy engine contains a first connector 310, which may communicate with a local proxy engine, such as local debug proxy 120 in FIG. 1, and a second connector 315, which may be coupled with a target system, such as target system 110 in FIG. 1. The connectors may be JDI connectors. The first connector 310 provides received commands to an input interpreter 330, and sends commands that are received from an output interpreter 325. Between the input and output interpreters and the second connector 315 is an identity mapper 340, which includes an identity map 345. In one implementation, the remote proxy engine also includes an information collector 320 to receive all input and output commands and provide these as needed to the identity mapper 340. The remote proxy engine may also include a proxy configuration 350.

In this illustration, a command may be received at the first connector 310. The command would be handled by an input interpreter 330, which will direct the command either to the information collector 320 and the identity mapper 340 if the command is a request for information, or to a command handler if the command is for other actions, such as, for example, proxy configurations. The remote proxy engine 305 also acts in the collection of information to be cached with the local proxy engine. For example, the target device may issue a suspend event, which is received at the second connector 315 and directed through the identity mapper 340 to the output interpreter 325. The output interpreter 325 sends a request to the information collector 320 to collect more information regarding the current event. The information collector 320 determines an information collection strategy for the current event and collects the state information for the target device (which may include but is not limited to thread, stack, and variable information). The collected information is received by the output interpreter 325, and is compressed and sent via a JDWP-extension command to the local proxy via the first connector 310.

In this particular implementation, the identity mapper 340 is used to wrap communications via second connector 315 because JDWP commands are identified via the command ID's. The collection of additional information via second connector 315 from the target brings the ID's into the debugger. The identity mapper is thus used to modify, or "repair", the command ID's for use by the appropriate components.

Figure 4:
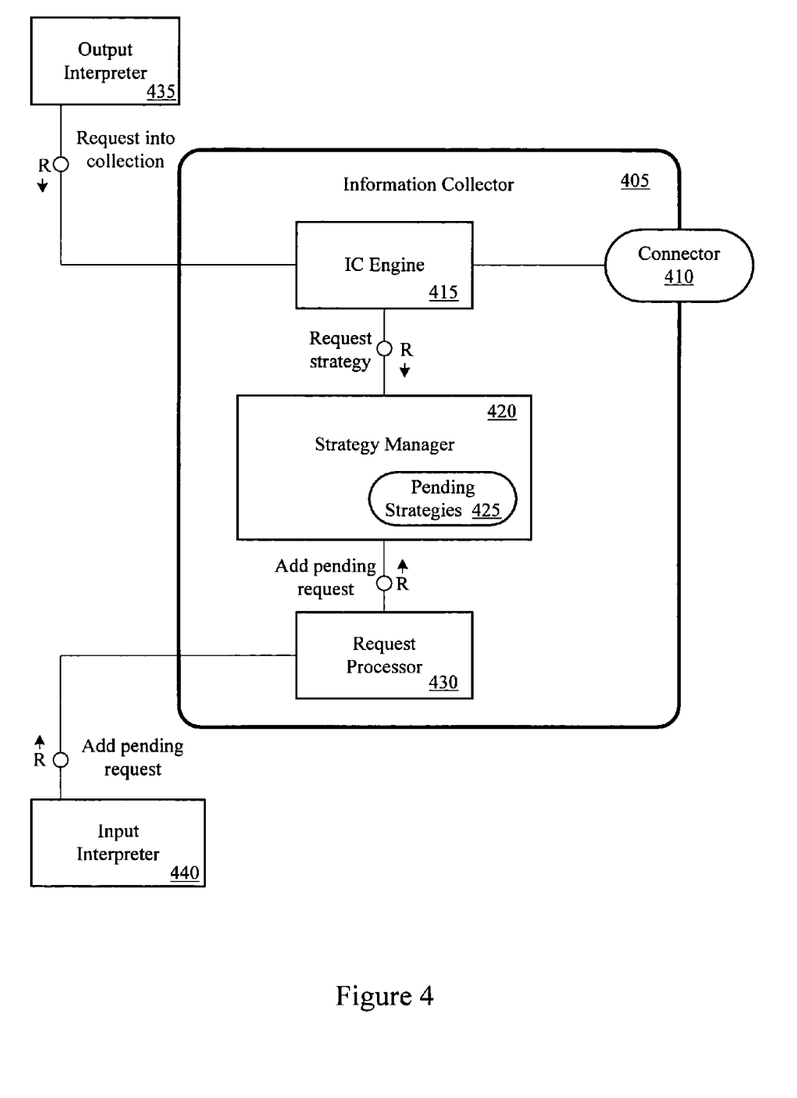
FIG. 4 is an illustration of an embodiment of an information collector for a remote proxy engine.

FIG. 4 is an illustration of an embodiment of an information collector for a remote proxy engine, such as the information collector 320 of remote proxy engine 305 in FIG. 3. In this illustration, the information collector 405 is coupled with an output interpreter 435 and an input interpreter 440. When an event is received by the output interpreter 435, the output interpreter 435 forwards a request for information collection to the information collector 405. The request is received by an information collection engine 415, which requests an information collection strategy from a strategy manager 420. The strategy manager includes a collection of pending strategies 425. Using the developed strategy, the information collection engine 415 sends the required commands through a connector 410 to the target device for the debugging process. The connector 410 may be a JDI connector.

Further, the input interpreter 440 may receive commands requesting information regarding the target device. A pending request is then added to a request processor 430, which directs the pending request to the strategy manager 420 to develop a strategy for the collection of the needed information.

Figure 5:
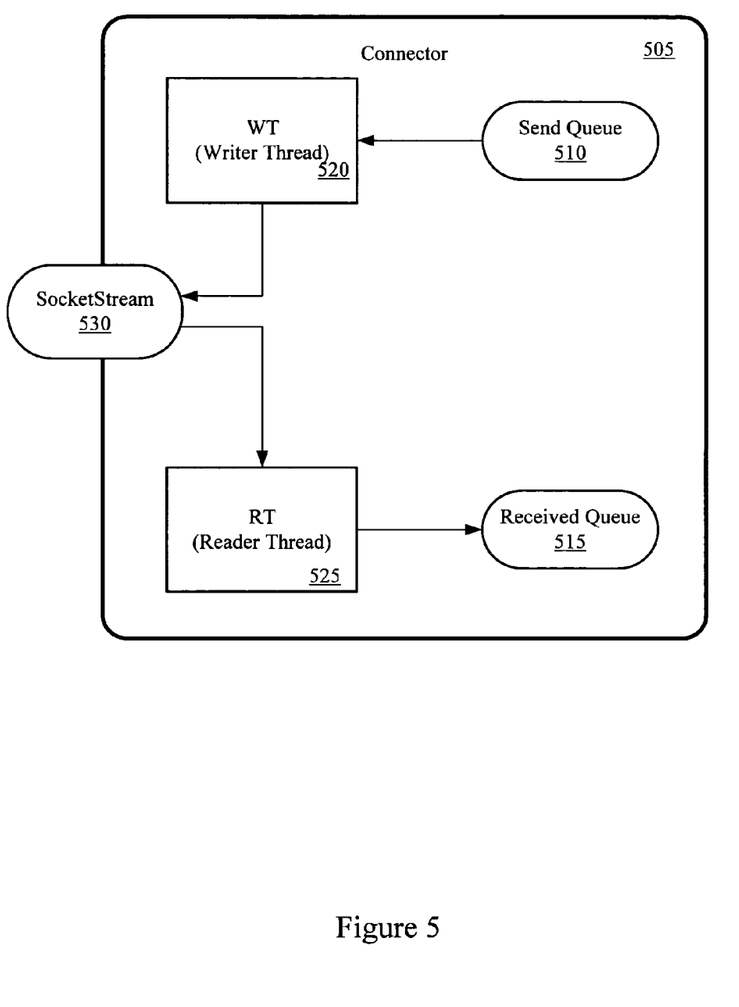
FIG. 5 is an illustration of an embodiment of a JDI connector that may be utilized in a proxy engine.

FIG. 5 is an illustration of a JDI connector that may be utilized in an embodiment of a proxy engine. The JDI connector may include connectors 210 and 215 of FIG. 2 and connectors 310 and 315 of FIG. 3. In an embodiment of the invention, JDI connectors may be included in particular implementation of a remote debugging environment, including use in a local proxy engine and in a remote proxy engine. In this illustration, the connector 505 includes a send queue 510, which may act as a queue of JDI command objects. The send queue is polled by a writer thread 520, which writes the JDI commands to an output stream, which is directed to a socket, illustrated as SocketStream 530. The SocketStream also receives data, with a reader thread 525 reading the data from an input data stream. The reader thread 525 then creates JDI command objects from the data and puts the objects into a received queue 515.

Figure 6:
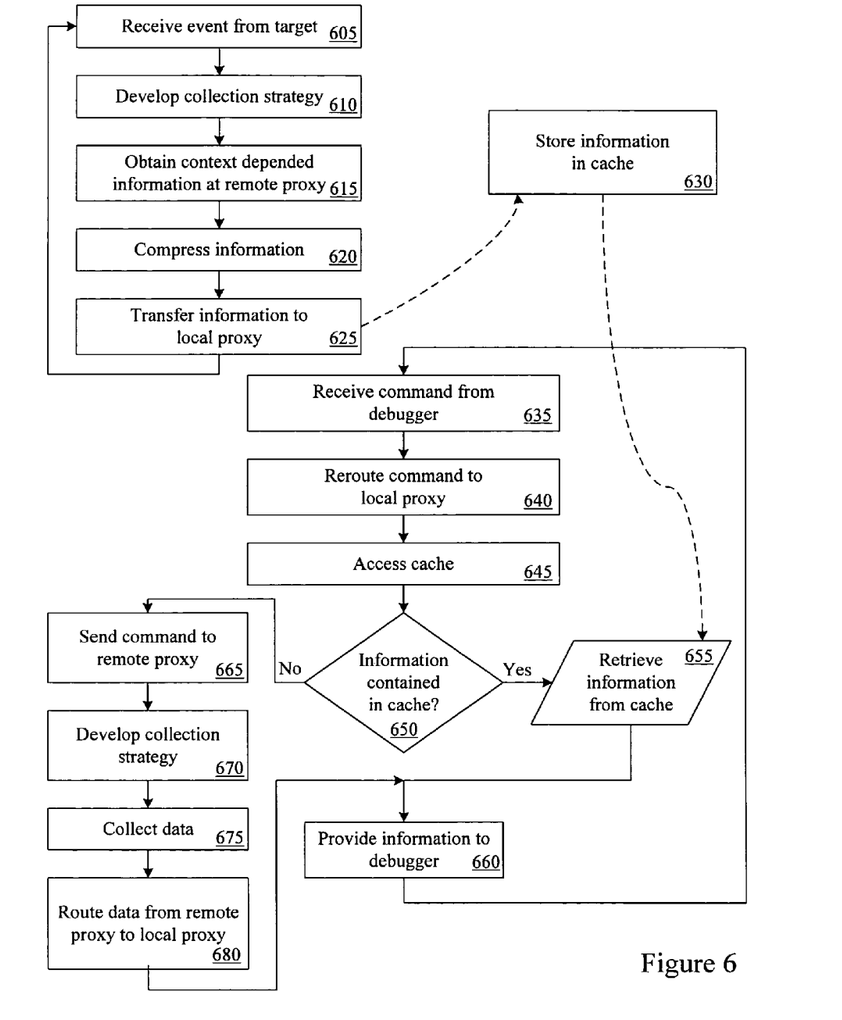
FIG. 6 is a flow chart to illustrate an embodiment of remote debugging of an application by proxy.

FIG. 6 is a flow chart to illustrate an embodiment of remote debugging of an application by proxy. In this illustration, an event may be received from a target system 605. In order to obtain further information, an information collection strategy is developed 610. The context depended information related to the event is collected at a remote proxy location 615. The information is compressed 620 to minimize the transfer time and is transferred to a local proxy 625. Upon being received at the local proxy, the information is cached 630.

A command requesting information may be received from the debugger used in the remote debugging operation 635. Rather than be sent to the target system, the command is rerouted to the local proxy 640. The local proxy then accesses the cache 645 to determine whether the information is already stored and thus would not need to be obtained from the target system. If the information is contained in the cache 655, the information is retrieved 660 and the information is provided to the debugger 665. The retrieval of the information from the cache avoids the need to send multiple information requests that require roundtrip communications over the communications channel between the debugger side and the remote side. If the information is not contained in the cache 655, then the command will be sent to the remote proxy 665, followed by development of a collection strategy 670 and collection of the needed information 675. The data is routed from the remote proxy to the local proxy 680 and then provided to the debugger 685.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A system comprising:
a local debug proxy on a local side of a network boundary between a debugger comprising a Java Debug Platform Architecture (JDPA) front-end and a debuggee comprising a JDPA back-end; and
a remote debug proxy on a remote side of the network boundary between the debugger and the debuggee, the remote debug proxy including a connector coupled with the local debug proxy;
wherein the remote debug proxy is configured to perform operations comprising:
receiving a first Java Debug Wire Protocol (JDWP) command, the first JDWP command having been sent from the debuggee to notify the debugger of an event in the debuggee and rerouted to the remote debug proxy, the first JDWP command including first information identifying the event; and
determining an information collection strategy for collecting second information in response to receiving the first JDWP command,
the second information including additional information pertaining to the event that the remote debug proxy anticipates that the debugger will request after receiving the first information;
sending a plurality of additional JDPW commands to the debuggee in accordance with the information strategy, wherein each of the additional JDWP command requests a portion of the second information;
receiving a plurality of JDPW replies rerouted to the remote debug proxy, each of the JDWP replies responding to a respective one of the additional JDWP commands and including a portion of the second information;
collecting the second information by collecting each portion of the second information included in the JDWP replies; and
packaging the first JDWP command and the second information into a JDWP extension command and sending the JDWP extension command to the local debug proxy on the local side of the network boundary;
store the second information in the cache of the local debug proxy; and
send a reply packet of the protocol to the debugger, the reply packet responding to the first command packet, the reply packet including the first information; and wherein the local debug proxy is configured to perform operations comprising:
receiving the JDWP extension command from the remote debug proxy;
storing the second information in a cache of the local debug proxy; and
sending the JDWP command packet to the debugger.

2. The system of claim 1, wherein:
the local debug proxy is further configured to erform operations comprising:
receiving a second JDWP command, the second JDWP command having been sent from the debugger to request third information from the debuggee and rerouted to the local debug proxy; and
based on a determination that the third information is not in the cache of the local debug proxy, performing operations including:
sending the second JDWP command to the remote debug proxy;
receiving a second JDWP extension command from the remote debug proxy, the second JDWP extension command comprising a first JDWP reply including the third information and fourth information that the remote debug proxy anticipates that the debugger will request after receiving the third information;
storing the fourth information in the cache of the local debug proxy; and
sending the first JDWP reply to the debugger; and
wherein the remote debug proxy is configured to perform operations including:
receiving the second JDWP command from the local debug proxy;
collecting the third information and the fourth information from the debuggee; and
sending a second JDWP extension command packet to the local debug proxy.

3. The system of claim 2, wherein the local debug proxy is further configured to perform operations comprising, based on a determination that the third information is in the cache of the local debug proxy, sending the first JDWP reply from the local debug proxy to the debugger using the cached third information.

4. The system of claim 1, wherein the storing of the second information in the cache of the local debug proxy comprises unpackaging the JDWP command and the second information based on a determination that the first JDWP extension command is a JDWP extension command.

5. The system of claim 2, wherein the collecting of the third information and the fourth information from the debuggee includes:
sending the second JDWP command from the remote debug proxy to the debuggee;
sending a third JDWP command from the remote debug proxy to the debuggee, the third JDWP command requesting the fourth information from the debuggee;
rerouting the first JDWP reply to the remote debug proxy, the first JDWP reply responding to the second JDWP command and including the third information;
rerouting the second JDWP reply to the remote debug proxy, the second reply, the second JDWP responding to the third JDWP command and including the fourth information; and
packaging the JDWP reply and the fourth information into the second JDWP extension command.

6. The system of claim 5, wherein the sending of the third JDWP command is done in accordance with a second information collection strategy developed to collect the fourth information.

7. A method comprising:
rerouting a first Java Debug Wire Protocol (JDWP) command through a remote debug proxy on a remote side of a network boundary between a debugger comprising a Java Debug Platform Architecture (JDPA) front-end and a debuggee comprising a JDPA back-end, the first JDWP command having been sent from the debuggee to notify the debugger of an event in the debuggee, the first JDWP command including first information identifying the event;
determining an information collection strategy at the remote debug proxy for collecting second information in response to receiving the first JDWP command, the second information being additional information pertaining to the event that the remote debug proxy anticipates that the debugger will request after receiving the first information;
sending a plurality of additional JDWP commands to the debuggee in accordance with the information collection strategy, wherein each of the additional JDWP commands requests a portion of the second information;
rerouting a plurality of JDWP replies to the remote debug proxy, each of the plurality of replies responding to a respective one of the additional JDWP commands and including a portion of the second information;
collecting the second information by collecting each portion of the second information included in the JDWP replies;
packaging the first JDWP command and the second information into a first JDWP extension command;
sending the first JDWP extension command to the local debug proxy on the local side of the network boundary;
storing the second information in a cache of the local debug proxy; and
sending the first JDWP command from the local debug proxy to the debugger.

8. The method of claim 7, further comprising:
rerouting a second JDWD command through the local debug proxy, the second JDWP command having been sent from the debugger to request third information from the debuggee;
based on a determination that the third information is not in a cache of the local debug proxy, performing operations including:
sending the second JDWP command from the local debug proxy to the remote debug proxy;
sending the second JDWP command from the remote debug proxy to the debuggee;
sending a third JDWP command from the remote debug proxy to the debuggee, the third JDWP command requesting fourth information from the debuggee, the fourth information including information that the remote debug proxy anticipates that the debugger will request after receiving the third information;
rerouting a first JDWP reply to the remote debug proxy, the first JDWP reply responding to the second JDWP command and including the third information;
rerouting a second JDWP reply through the remote debug proxy, the second JDWP reply responding to the third JDWP command and including the fourth information;

packaging the first JDWP reply and the fourth information into a second JDWP extension command and sending the second JDWP extension command to the local proxy;

storing the fourth information in a cache of the local debug proxy; and sending the first JDWP reply from the local debug proxy to the debugger.

9. The method of claim 8, further comprising, based on a determination that the third information is in the cache of the local proxy, sending the first JDWP from the local debug proxy to the debugger using the cached third information.

10. The method of claim 8, wherein the storing of the second information in the cache of the local proxy comprises unpackaging the first JDWP command and the second information based on a determination that the first JDWP extension command is a JDWP extension command.

11. The method of claim 8, wherein the sending of the third JDWP command is done in accordance with a second information collecting strategy developed to collect the third information.

12. A non-transitory machine-readable medium having stored thereon data representing instructions that, when executed by a processor, cause the processor to perform operations comprising:

rerouting a first Java Debug Wire Protocol (JDWP) command through a remote debug proxy on a remote side of a network boundary between a debugger comprising a Java Debug Platform Architecture (JDPA) front-end and a debuggee comprising a JPDA back-end, the first JDWP command having been sent from the debuggee to notify the debugger of an event in the debuggee, the first JDWP command including first information identifying the event;

determining an information collection strategy at the remote debug proxy for collecting second information in response to receiving the first JDWP command, the second information being additional information pertaining to the event that the remote debug proxy anticipates that the debugger will request after receiving the first information;

sending a plurality of additional JDWP commands to the debuggee in accordance with the information collection strategy, wherein each of the additional JDWP commands request a portion of the second information;

rerouting a plurality of JDWP replies to the remote debug proxy, each of the JWDP replies responding to a respective one of the additional JDWP commands and including a portion of the second information;

collecting the second information by collecting each portion of the second information included in the JDWP replies;

packaging the first JDWP command and the collected second information into a JDWP extension command;

sending the first JDWP extension command to the local debug proxy on the local side of the network boundary;

storing the second information in a cache of the local debug proxy; and sending the first JDWP command from the local debug proxy to the debugger.

13. The non-transitory machine-readable medium of claim 12, the operations further comprising:

rerouting a second JDWP command through the local debug proxy, the second JDWP command having been sent from the debugger to request third information from the debuggee;

based on a determination that the third information is not in the cache of the local debug proxy, performing operations including:

sending the second JDWP command from the local debug proxy to the remote debug proxy;

sending the second JDWP command packet from the remote debug proxy to the debuggee;

sending a third JDWP command from the remote debug proxy to the debuggee, the third JDWP command requesting fourth information from the debuggee, the fourth information including information that the remote debug proxy anticipates that the debugger will request after receiving the third information;

rerouting a first JDWP reply to the remote debug proxy, the first JDWP reply responding to the third JDWP command and including the third information;

rerouting a second JDWP reply through the remote debug proxy, the second JDWP reply responding to the third JDWP and including the fourth information;

packaging the first JDWP reply and the fourth information into a second JDWP extension command;

sending the second JDWP extension command to the local debug proxy;

storing the fourth information in the cache of the local debug proxy; and sending the first JDWP reply from the local debug proxy to the debugger.

14. The non-transitory machine-readable medium of claim 13, the operations further comprising, based on a determination that the third information is in the cache of the local proxy, sending the first JDWP reply from the local debug proxy to the debugger using the cached third information.

15. The non-transitory machine-readable medium of claim 13, wherein the storing of the second information in the cache of the local proxy comprises unpackaging the first JDWP command and the second information based on a determination that the first JDWP extension command is a JDWP extension command.

16. The non-transitory machine-readable medium of claim 13, wherein the sending of the third JDWP command is done in accordance with a second information collection strategy developed to collect the fourth information.

* * * * *